US011181155B2

(12) United States Patent
Novin (10) Patent No.: US 11,181,155 B2
(45) Date of Patent: Nov. 23, 2021

(54) RELEASABLE ROLLER CLUTCH AND ADJUSTABLE HINGE ASSEMBLY USING THE SAME

(71) Applicant: Southco, Inc., Concordville, PA (US)

(72) Inventor: Eugene Novin, Concordville, PA (US)

(73) Assignee: Southco, Inc., Concordville, PA (US)

( * ) Notice: Subject to any disclaimer, the term of this patent is extended or adjusted under 35 U.S.C. 154(b) by 645 days.

(21) Appl. No.: 15/554,036

(22) PCT Filed: Mar. 3, 2016

(86) PCT No.: PCT/US2016/020655
§ 371 (c)(1),
(2) Date: Aug. 28, 2017

(87) PCT Pub. No.: WO2016/141168
PCT Pub. Date: Sep. 9, 2016

(65) Prior Publication Data
US 2018/0266501 A1 Sep. 20, 2018

Related U.S. Application Data

(60) Provisional application No. 62/127,547, filed on Mar. 3, 2015.

(51) Int. Cl.
*F16C 11/10* (2006.01)
*F16D 41/08* (2006.01)
(Continued)

(52) U.S. Cl.
CPC .......... *F16D 41/088* (2013.01); *B60N 3/004* (2013.01); *E05D 11/105* (2013.01);
(Continued)

(58) Field of Classification Search
CPC ....... F16C 11/103; B60N 3/001; B60N 3/002; B60N 3/004; Y10T 16/54038;
(Continued)

(56) References Cited

U.S. PATENT DOCUMENTS 2,591,476 A * 4/1952 Swanson ............... E05F 1/1215
16/54
3,476,226 A 11/1969 Massey
(Continued)

FOREIGN PATENT DOCUMENTS

EP 2039572 A1 3/2009
FR 2 883 529 * 9/2006 ............ B60N 3/00
(Continued)

OTHER PUBLICATIONS

Chinese Office Action for Application No. 201680013756.7, dated Nov. 23, 2018 with translation, 14 pages.
(Continued)

*Primary Examiner* — Michael P Ferguson
(74) *Attorney, Agent, or Firm* — RatnerPrestia (57) ABSTRACT

According to one aspect, a releasable roller clutch includes a shaft and a clutch housing positioned around the shaft. The shaft and clutch housing together defining a space there between with rollers positioned in said space. The rollers permit rotation of the shaft relative to the clutch housing when in an unlocked position in which the rollers are not wedged and prevent rotation of the shaft relative to the clutch housing when in a locked position in which the rollers are wedged. A cage extends into the space defined between the shaft and clutch housing. The cage is moveable relative to the clutch housing between an unlocking position and a locking position. The cage has a contact edge positionable to prevent the rollers from moving from the unlocked position to the locked position when the cage is in an unlocking position. The releasable roller clutch permits rotation of the shaft relative to the clutch housing in both directions when the cage is in the unlocking position.

9 Claims, 11 Drawing Sheets

(51) Int. Cl.
    *B60N 3/00*     (2006.01)
    *E05D 11/10*     (2006.01)
    *F16D 7/00*     (2006.01)
    *F16D 15/00*     (2006.01)
    *F16D 41/067*     (2006.01)

(52) U.S. Cl.
    CPC ............ *F16C 11/103* (2013.01); *F16D 7/005* (2013.01); *F16D 15/00* (2013.01); *F16D 41/067* (2013.01); *Y10T 16/540247* (2015.01); *Y10T 403/592* (2015.01)

(58) Field of Classification Search
    CPC ....... Y10T 16/54024; Y10T 16/540247; Y10T 403/591; Y10T 403/592; Y10T 403/32319; Y10T 403/32861; Y10T 403/32868; E05D 11/1028; E05D 11/105; E05D 2011/1092
    See application file for complete search history.

(56) References Cited

U.S. PATENT DOCUMENTS

| | | | |
|---|---|---|---|
| 4,230,211 A | | 10/1980 | Goto et al. |
| 5,412,842 A | * | 5/1995 | Riblett ...................... E05D 5/12 16/250 |
| 6,050,512 A | | 4/2000 | Jung |
| 6,206,164 B1 | * | 3/2001 | Kurita ..................... F16D 41/10 192/223.2 |
| 6,301,748 B1 | * | 10/2001 | Su-Man ................ G06F 1/1616 16/337 |
| 6,871,384 B2 | * | 3/2005 | Novin ................. B60R 11/0235 16/337 |
| 8,662,271 B2 | | 3/2014 | Iwano et al. |
| 2011/0127134 A1 | | 6/2011 | Iwano et al. |

FOREIGN PATENT DOCUMENTS

| | | | | |
|---|---|---|---|---|
| JP | 63146249 U | | 9/1988 | |
| JP | 2011133103 A | | 7/2011 | |
| KR | 10-1388982 | * | 4/2014 | ............... B60N 3/00 |
| WO | 9714576 A1 | | 4/1997 | |

OTHER PUBLICATIONS

International Search Report and Written Opinion for International Application PCT/US2016/020655, dated August 8, 2016—10 Pages.
Notice of Reasons for Rejection for Japanese Application No. 2017-546217, dated Feb. 4, 2020, with translation, 8 pages.
Notice of Reasons for Rejection for Japanese Application No. 2017-546217, dated Jul. 28, 2020, with translation, 6 pages.

* cited by examiner

RELEASABLE ROLLER CLUTCH AND ADJUSTABLE HINGE ASSEMBLY USING THE SAME

CROSS-REFERENCE TO RELATED APPLICATION

This application is the U.S. national phase application of PCT Application No. PCT/US2016/020655, filed Mar. 3, 2016 which is related to, and claims the benefit of priority of, U.S. Provisional Application No. 62/127,547, entitled RELEASABLE ROLLER CLUTCH AND ADJUSTABLE HINGE USING THE SAME, filed on Mar. 3, 2015, the contents of which are incorporated herein by reference in their entirety for all purposes.

FIELD OF THE INVENTION

This invention generally relates to roller clutches, adjustable hinges, and systems such as tray table assemblies that can include roller clutches and adjustable hinges.

BACKGROUND OF THE INVENTION

Roller clutches typically permit rotation in only one direction. In such roller clutches, rollers prevent rotation in the undesired direction by wedging between two surfaces of the roller clutch upon the roller clutch rotating in the undesired direction.

SUMMARY OF THE INVENTION

Aspects of the invention provide for roller clutches, adjustable hinges, and systems such as tray table assemblies that can include roller clutches and adjustable hinges.

According to one aspect of the invention, a releasable roller clutch includes a shaft and a clutch housing positioned around the shaft. The shaft and the clutch housing together defining a space there between. Rollers may be positioned in the space defined between the shaft and the clutch housing. The rollers permit rotation of the shaft relative to the clutch housing when the rollers are in an unlocked position in which the rollers are not wedged, while the rollers prevent rotation of the shaft relative to the clutch housing when the rollers are in a locked position in which the rollers are wedged. The releasable roller clutch has a cage extending into the space defined between the shaft and the clutch housing. The cage is moveable relative to the clutch housing between an unlocking position and a locking position. The cage has a contact edge positionable to prevent the rollers from moving from the unlocked position to the locked position when the cage is in an unlocking position. The releasable roller clutch permits rotation of the shaft relative to the clutch housing in both directions when the cage is in the unlocking position.

In one embodiment, the releasable roller clutch can also include an actuator positionable to urge the cage from the locking position to the unlocking position or from the unlocking position to the locking position. The actuator can be biased to urge the cage toward the locking position.

In another embodiment, the releasable roller clutch may include a first torque element coupled to the shaft and positioned to inhibit rotation of the shaft. The torque element may provide friction torque. The first torque element may inhibit rotation of the shaft when the cage of the releasable roller clutch is in the locking position and when the rollers are in the locked position, thus providing overload protection allowing rotation of the shaft when a load on the clutch housing exceeds a predetermined torque.

In a further embodiment, the releasable roller clutch may have a first torque element that is positioned within the mounting element and/or a second torque element coupled to the shaft to inhibit rotation of the shaft. The second torque element may be positioned within the clutch housing. The second torque element may be configured to provide asymmetrical friction torque in a direction opposed to the asymmetrical friction torque provided by the first torque element.

In yet a further embodiment, the releasable roller clutch includes an actuator coupled to move the cage from the locking position to the unlocking position. The actuator may have a push rod and be configured to actuate upon a force being exerted on the push rod in a direction toward or away from the actuator sleeve.

According to another aspect of the invention, an adjustable hinge assembly that provides overload protection includes a shaft and a roller clutch having a clutch housing positioned around the shaft. The adjustable hinge assembly further includes rollers positioned in a space defined between the shaft and the clutch housing. The rollers permit rotation of the shaft relative to the clutch housing when the rollers are in an unlocked position, while the rollers prevent rotation of the shaft relative to the clutch housing when the rollers are in a locked position. The roller clutch also includes a cage extending into the space defined between the shaft and the clutch housing. The cage is moveable relative to the clutch housing between an unlocking position and a locking position. The roller clutch permits rotation of the shaft relative to the clutch housing in both directions when the cage is in the unlocking position. Additionally, the adjustable hinge assembly includes a torque element coupled to the shaft and positioned to inhibit rotation of the shaft. The torque element provides friction torque and inhibits rotation of the shaft when the cage of the roller clutch is in the locking position and when the rollers are in the locked position, thus providing overload protection that allows rotation of the shaft when a load on the clutch housing exceeds a predetermined torque.

In one embodiment, the adjustable hinge assembly includes a torque element that is configured to provide different friction torques when the shaft is rotated relative to the torque element in different directions. The torque element may inhibit rotation of the shaft when the cage of the releasable roller clutch is in the locking position and when the rollers are in the locked position, thus providing overload protection allowing rotation of the shaft when a load on the clutch housing exceeds a predetermined torque. The torque element may be positioned within the mounting element.

In another embodiment, the adjustable hinge assembly includes a second torque element coupled to the shaft to inhibit rotation of the shaft. The second torque element may be positioned within the clutch housing. The second torque element may provide asymmetrical friction torque in a direction opposed to the asymmetrical friction torque provided by the first torque element.

A further aspect of the invention provides an adjustable hinge assembly with a releasable roller clutch and an adjustable hinge, the adjustable hinge assembly including a mounting element; a shaft coupled for rotation relative to the mounting element; and a roller clutch having a clutch housing positioned around the shaft. The roller clutch includes rollers positioned in a space defined between the shaft and the clutch housing. The rollers permit rotation of the shaft relative to the clutch housing when the rollers are in an unlocked position and prevent rotation of the shaft relative to the clutch housing when the rollers are in a locked position. The roller clutch also has a cage extending into the space defined between the shaft and the clutch housing. The cage being moveable relative to the clutch housing between an unlocking position and a locking position. The roller clutch permits rotation of the shaft relative to the clutch housing in both directions when the cage is in the unlocking position. The adjustable hinge assembly further including a torque element coupled to the shaft and positioned to inhibit rotation of the shaft relative to the mounting element. Additionally, the tray table assembly has an actuator coupled to move the cage from the locking position to the unlocking position.

In an embodiment, the adjustable hinge assembly can also include a biasing mechanism positioned to bias the cage of the roller clutch toward the locking position, and the actuator can be configured to move the cage of the roller clutch toward the unlocking position against the biasing mechanism.

In another embodiment, the adjustable hinge assembly includes a tray table having a proximal end portion coupled to the clutch housing and a distal end portion extending from the clutch housing.

BRIEF DESCRIPTION OF THE DRAWINGS

The invention is best understood from the following detailed description when read in connection with the accompanying drawings, with like elements having the same reference numerals. When a plurality of similar elements are present, a single reference numeral may be assigned to the plurality of similar elements with a small letter designation referring to specific elements. Included in the drawings are the following figures.

DETAILED DESCRIPTION OF EMBODIMENTS OF THE INVENTION

Although the invention is illustrated and described herein with reference to specific embodiments, the invention is not intended to be limited to the details shown. Rather, various modifications may be made in the details within the scope and range of equivalents of the claims and without departing from the invention. Furthermore, one of skill in the art would readily be able to utilize various aspects of the embodiments in different fields of endeavor.

One-way roller clutches can be employed when uninhibited rotation in only one direction is desired. In such roller clutches, springs may be utilized to bias the roller towards a position in which wedging occurs to ensure that the one-way clutch locks immediately upon rotating in the undesired direction. The simplicity of such one-way roller clutch assemblies can advantageously reduce costs related to breakages and maintenance.

Figure 1:
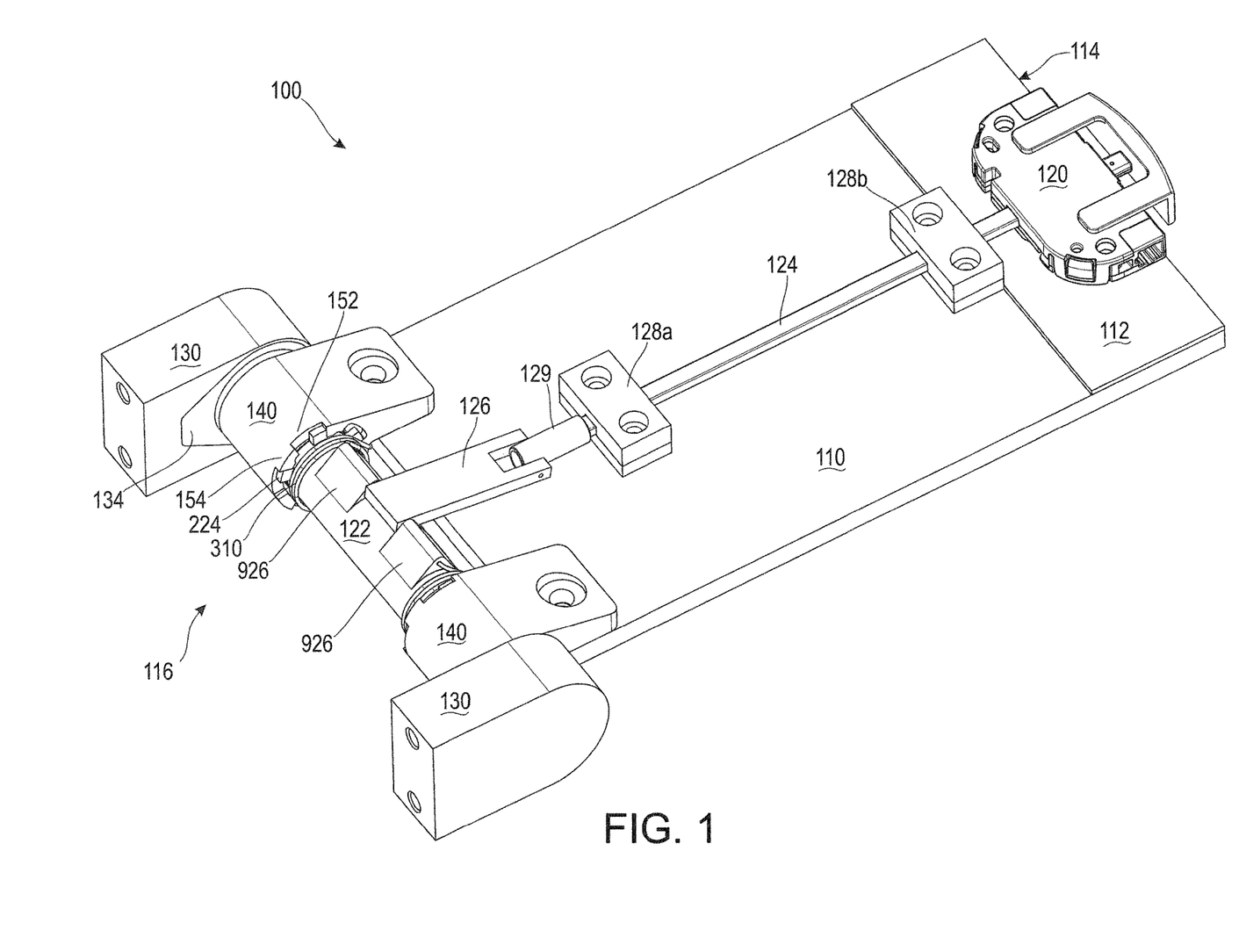
FIG. 1 is a perspective view depicting an embodiment of a releasable roller clutch assembly incorporated into a tray table assembly in the down position in accordance with aspects of the invention.

Referring now to the figures, FIG. 1 is a perspective view depicting an embodiment of a releasable roller clutch assembly incorporated into a tray table assembly in the down position in accordance with aspects of the invention. As a general overview, assembly 100 may include an actuator 120, an actuator sleeve 122, a clutch housing 140, a shaft 230 (FIG. 2), a cage 210 (FIG. 2), and one or more rollers 260.

Actuator 120 is coupled to the actuator sleeve 122. The actuator 120 may be designed as a push button, a lever, a switch, a latch release, a dial, an electronic mechanism, or any other mechanical or electro-mechanical system that affects the actuator sleeve 122. Alternatively, actuation may be achieved by directly actuating the actuator sleeve 122, e.g., by combining the actuator 120 and actuator sleeve 122, thereby enabling the optional elimination of the actuator 120.

In one embodiment, the releasable roller clutch assembly 100 is employed in a foldable tray table system as shown in FIG. 1. In such embodiments, the roller clutch assembly 100 includes a tray 110 and an actuator mounting plate 112. The tray 110 may be attached to one or more clutch housings 140 at a proximal end 116 of the tray table system employing a releasable roller clutch assembly 100. The actuator mounting plate 112 facilitates attachment of the actuator 120 to a structure, e.g., a tray 110. Additionally, the actuator mounting plate 112 may provide further support and rigidity to the tray 110.

Preferably, the actuator 120 is ergonomically positioned on the releasable roller clutch assembly 100. For example, the actuator 120 may be positioned near or at the distal end 114 and/or the proximal end 116 of the releasable roller clutch assembly 100 and/or the tray 110 of a tray table system to facilitate access by the user.

To enable the actuator 120 to affect the actuator sleeve 122 upon actuation, the actuator 120 may be coupled to the actuator 122 sleeve directly or indirectly, e.g., through attachment to various mechanical features and/or by way of electronic communications. In one embodiment, the actuator 120 is indirectly coupled to the actuator sleeve 122 by way of coupling to an actuator rod 124, an actuator pressure stabilizer 129, and an actuator sleeve connector 126 using, e.g., mechanical means, such as a pin 322, crimping, threading, etc. and/or using non-mechanical means, such as adhesives.

A securing feature 128a and/or 128b may be employed to secure an actuator rod 124, actuator pressure stabilizer 129, or actuator connector 126 to a tray 110 or other structure located between the actuator 120 and actuator sleeve 122. The actuator pressure stabilizer 129 may include a sleeve 324 and a spring element 326 positioned between the actuator 120 and the actuator sleeve 122. The actuator pressure stabilizer 129 increases the amount of force required to actuate the actuator sleeve 122, thus preventing accidental actuation.

Additionally, the actuator pressure stabilizer 129 may enhance the user's experience when using the releasable roller clutch assembly 100 by providing a sensation that the actuation occurred consistently as the actuator 120 was actuated. In another embodiment, for example, actuation of the actuator 120 sends an electronic signal to a mechanism that directly or indirectly actuates the actuator sleeve 122.

Figure 2:
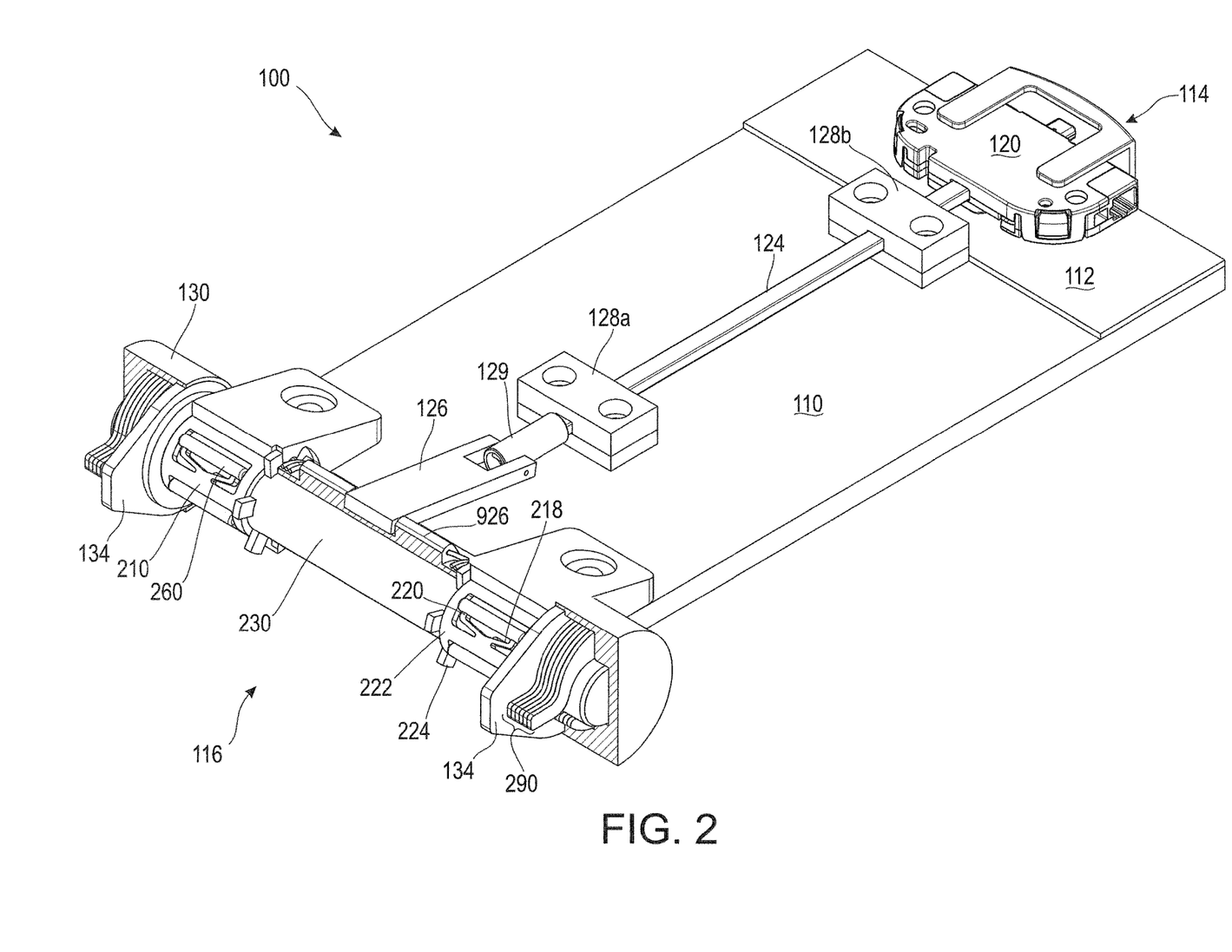
FIG. 2 is a perspective view depicting the tray table assembly of FIG. 1, with selected portions removed to reveal internal components.

FIG. 2 is a perspective view depicting the tray table assembly of FIG. 1, with selected portions removed to reveal internal components. A shaft 230 has a longitudinal axis. The shaft 230 may be designed as a hollow cylinder, to reduce the weight and cost of materials, or as solid cylinder, to increase strength and durability of the releasable roller clutch assembly 100. Various dimensions of the shaft 230, including non-uniform widths, lengths, cross-sectional shapes and circumferences, will be understood by one of skill in the art from the description herein.

Figure 4:
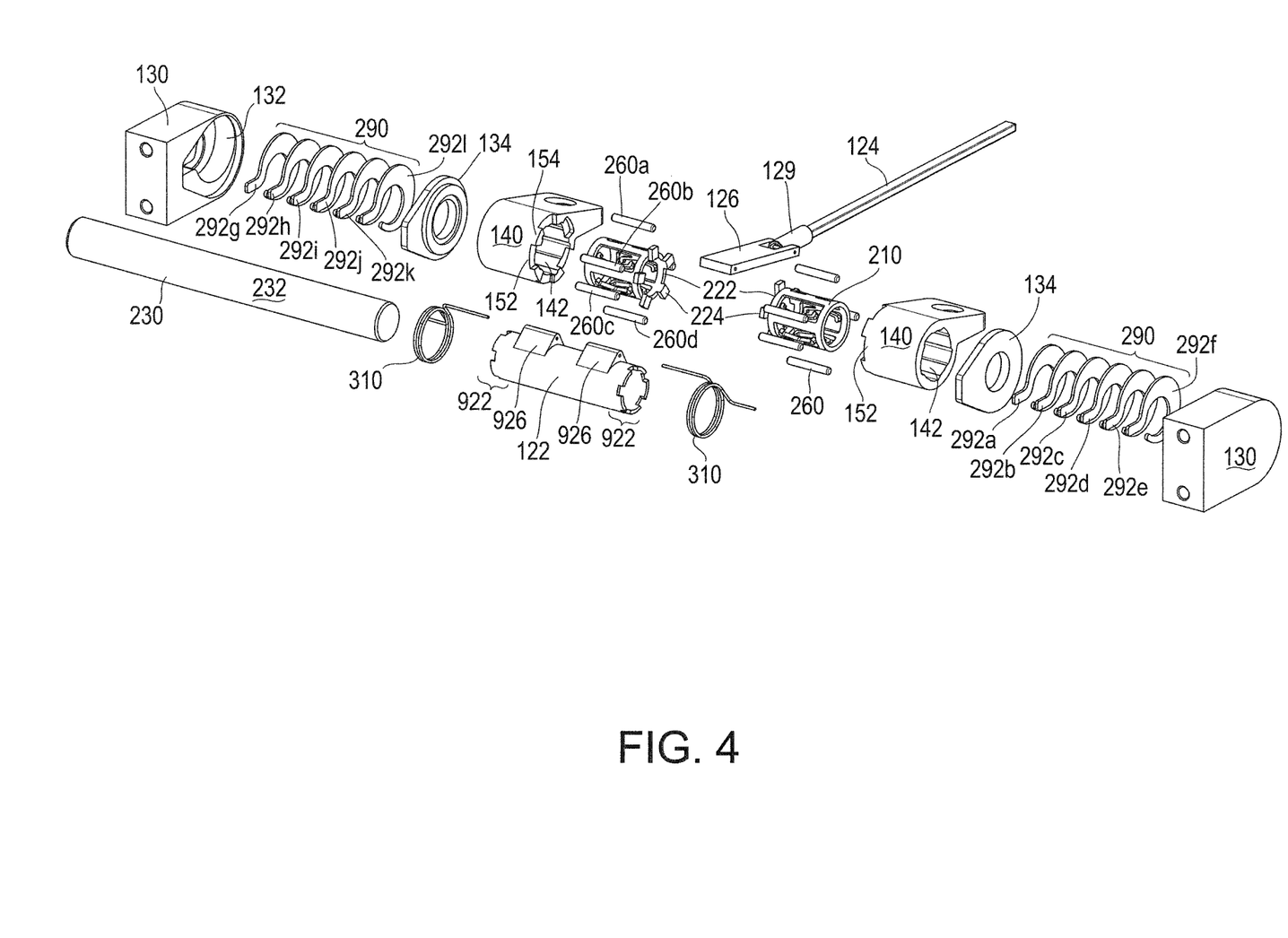
FIG. 4 is an exploded perspective view of components of the tray table assembly of FIG. 1.

The shaft 230, or a portion thereof, may be secured within a mount 130. The mount 130 may be utilized to affix the releasable roller clutch assembly 100 to a structure. For example, the mount 130 may be configured to affix to the back of a car seat, a plane seat, a door, a wall, or any other structure. Referring specifically to FIG. 4, the mount 130 may contain a friction mechanism 290 that is positioned in a recess defined by an inner surface 132 of the mount 130.

The friction mechanism 290 generates friction against the shaft 230 to resist rotation of the shaft 230 around the shaft axis 234. Additionally, the friction mechanism 290 may produce torque in a particular rotational direction. In one embodiment, the friction mechanism 290 includes one or more torque elements 292. The torque elements 292 may be asymmetrical to provide impetus to the shaft to rotate in only one direction or to rotate with different friction torques in different directions. In one embodiment, the torque elements 292 may provide different friction torques when the shaft is rotated relative to the torque element in first and second directions. A port 134 may be attached to the mount 130 to secure the friction mechanism 290 within the recess defined by the mount 130. The port 134 has an opening to receive the shaft 230.

Examples of a torque system that can be used in this invention are described in U.S. patent application Ser. No. 14/527,063, filed Oct. 29, 2014 and entitled VARIABLE FRICTION HINGE, the contents of which are incorporated herein by reference in their entirety. Other torque systems are contemplated as well.

Figure 3:
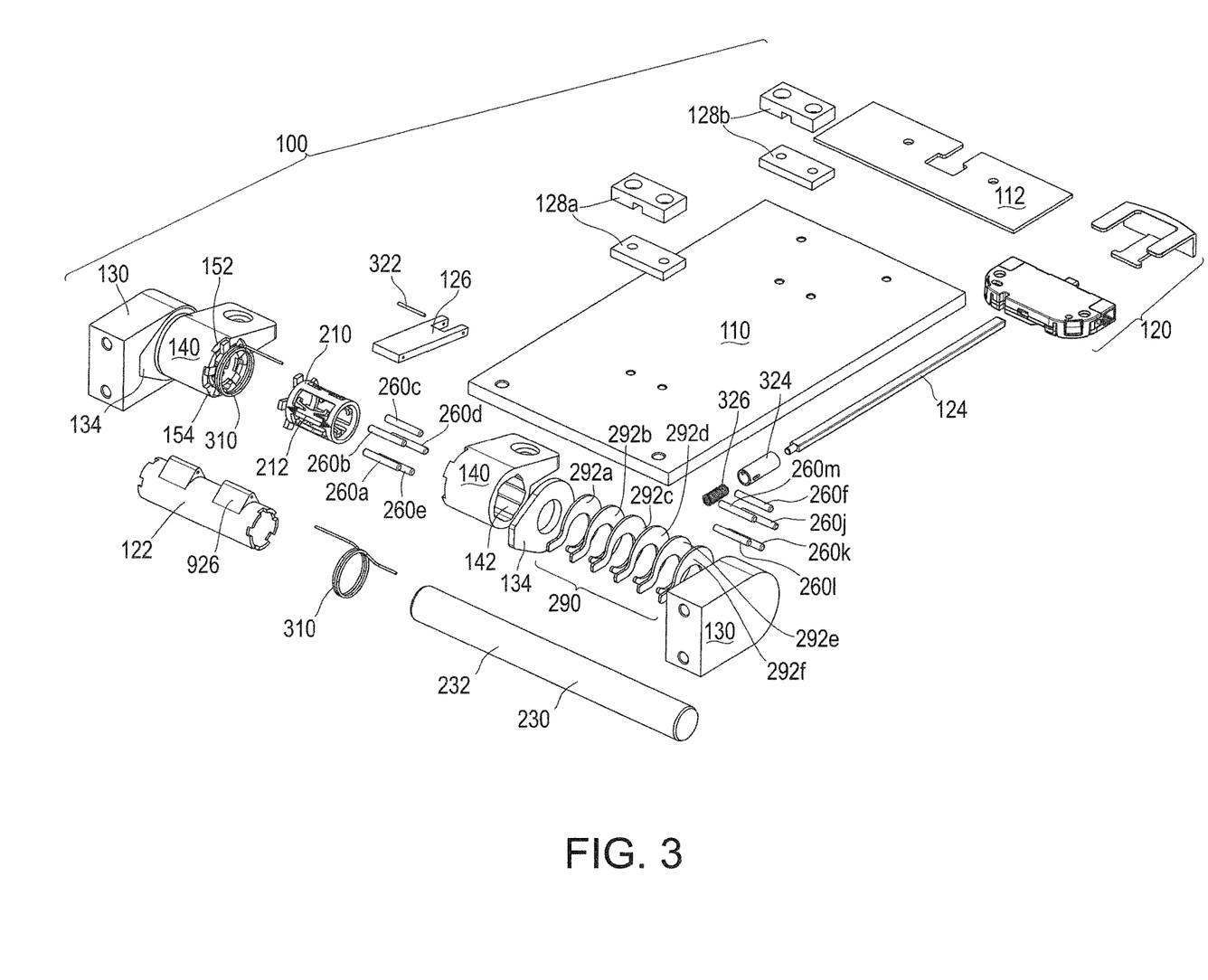
FIG. 3 is an exploded perspective view of the tray table assembly of FIG. 1.
Figure 6A:
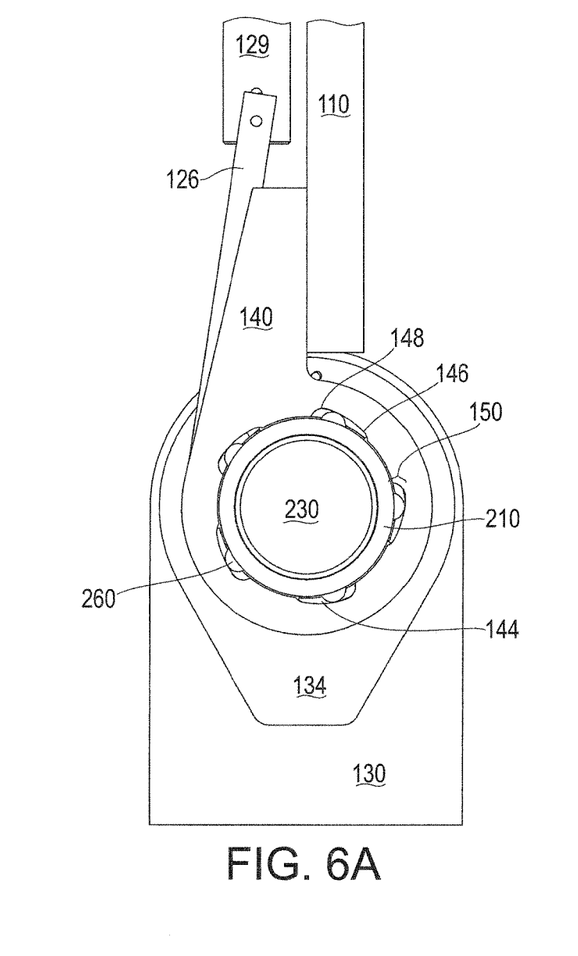
FIGS. 6a and 6b are cross-sectional end views of components of the tray table assembly of FIG. 1.
Figure 6B:
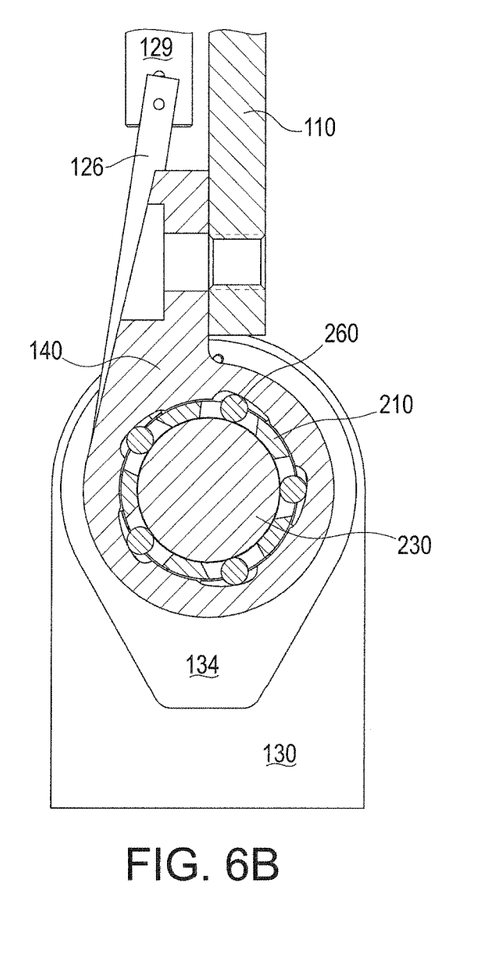
Figures 7A, 7B, 7C, 7D, 7E, 7F, 7G:
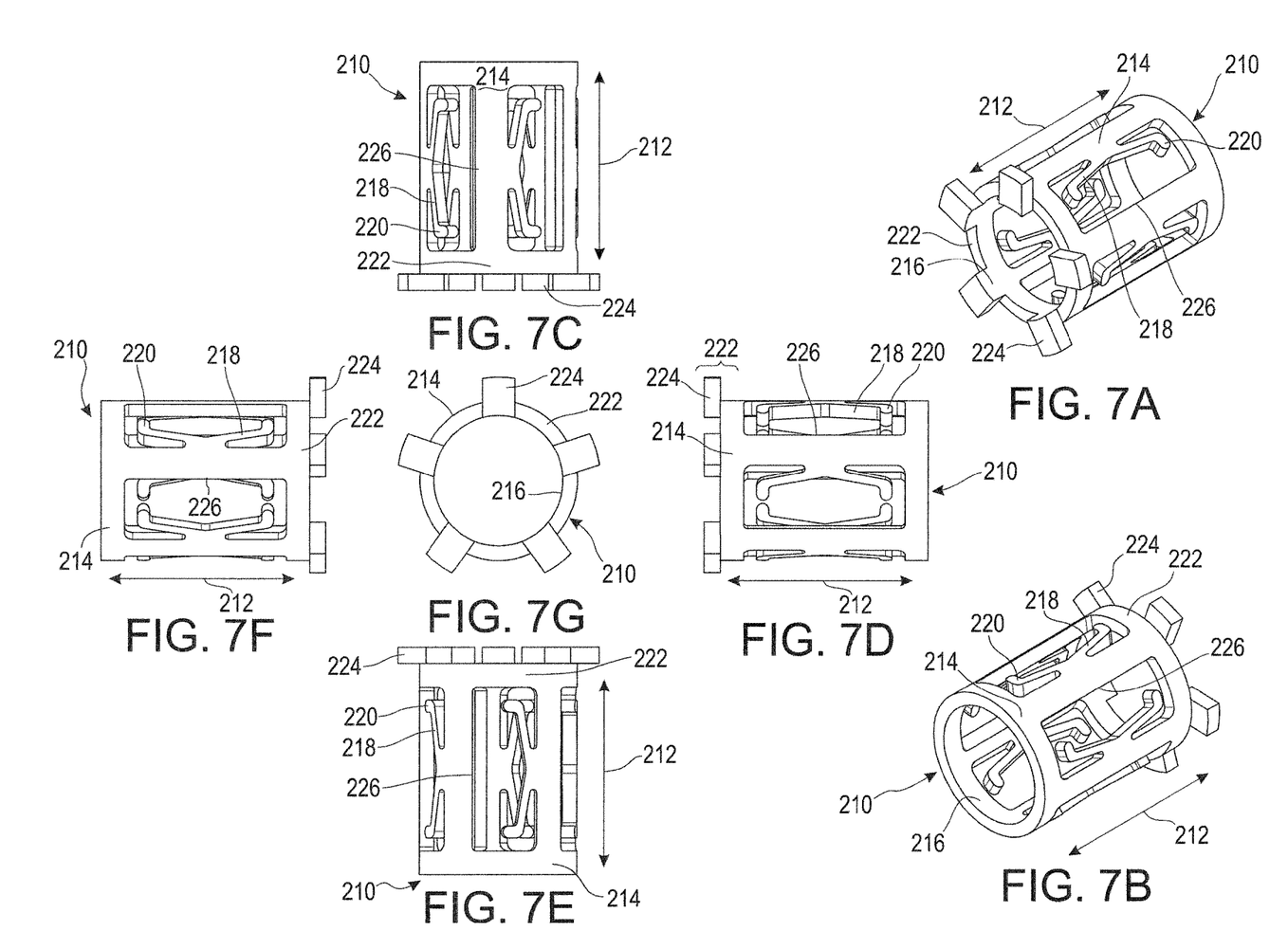
FIGS. 7a-7g depict an embodiment of a cage component that can be used in the tray table assembly of FIG. 1.

Referring to FIGS. 3 and 6, the clutch housing 140 is positioned around the shaft 230. The clutch housing 140 has an inner surface 142. One or more indents 144 are defined by the inner surface 142 of the clutching housing 140.

Figure 8A:
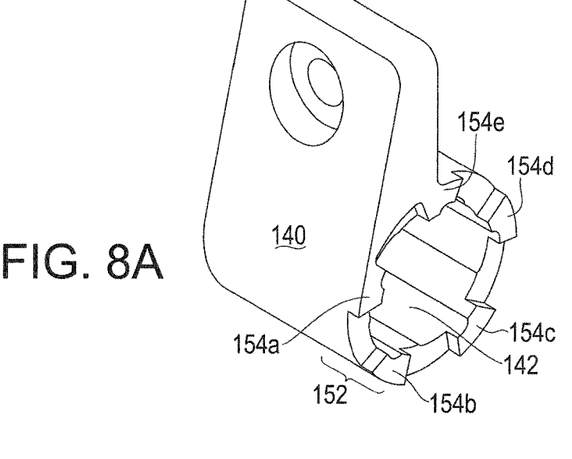
FIGS. 8a-8e depict an embodiment of a clutch housing component that can be used in the tray table assembly of FIG. 1.
Figure 8B:
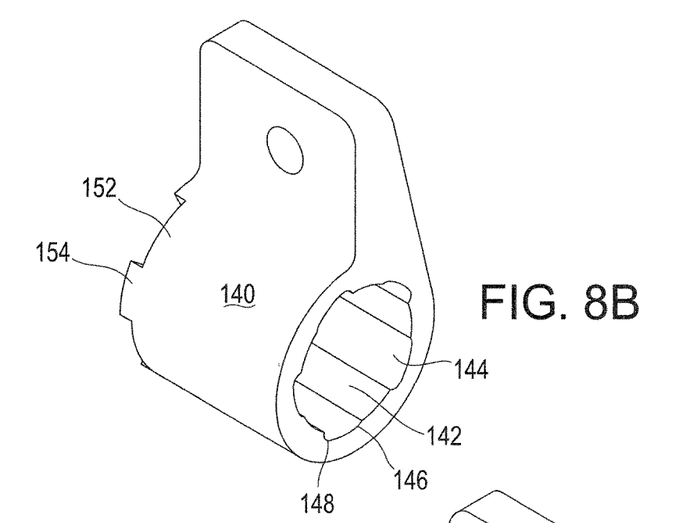
Figure 8C:
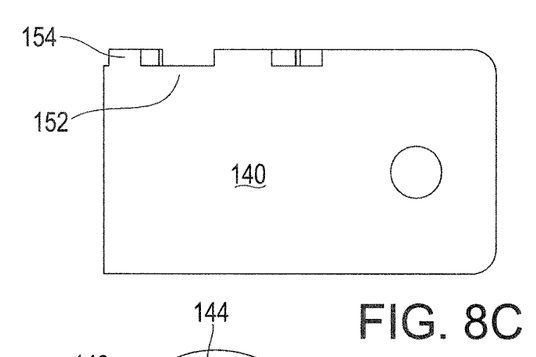
Figure 8D:
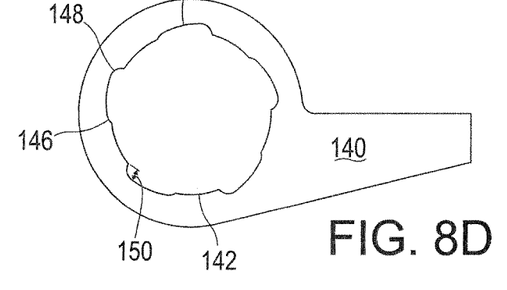
Figure 8E:
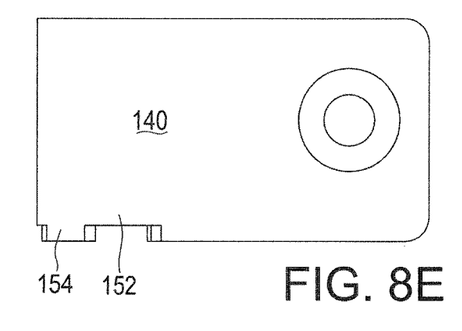

Referring now to FIG. 8d, the one or more indents 144 have a maximum depth portion 150. The indents 144 may also have one or more slope portions 146 and at least one pocket portion 148. The side of the indent 144 near the pocket portion 148 is abruptly delineated. Preferably, the maximum depth portion 150 is at or near the side of the indent 144 in or near the pocket portion 148. The side of the indent 144 near the slope portion 146 may be gradually delineated. Further, the depth of the indent 144 gradually decreases from the maximum depth portion 150 to the edge of the indent 144 delineating the slope portion 146.

Figure 5A:
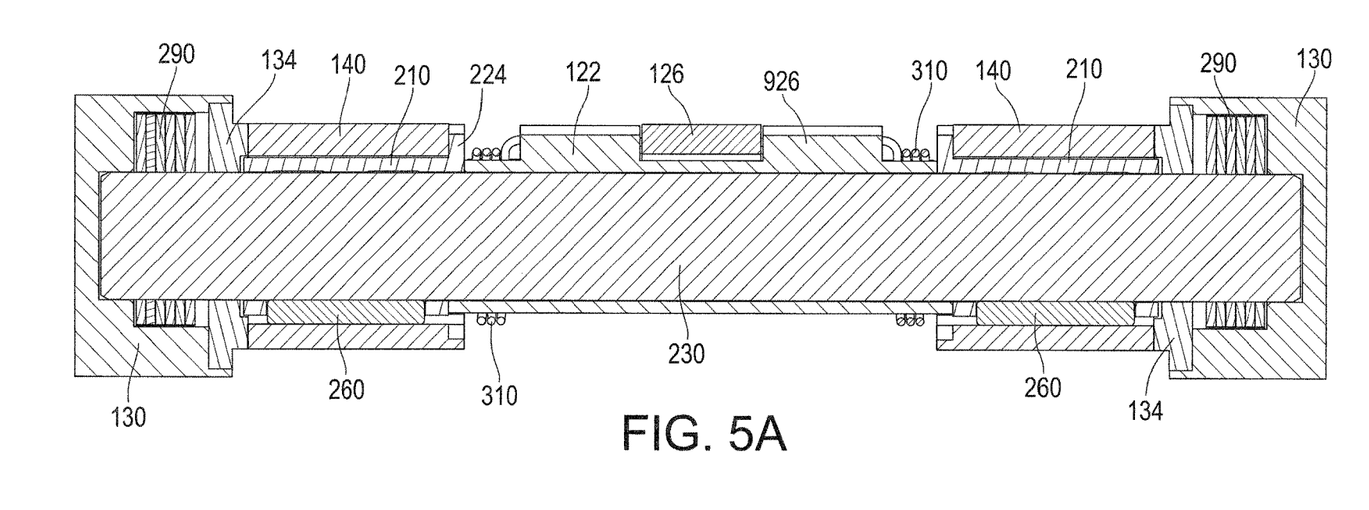
FIGS. 5a and 5b are cross-sectional front views of components of the tray table assembly of FIG. 1.
Figure 5B:
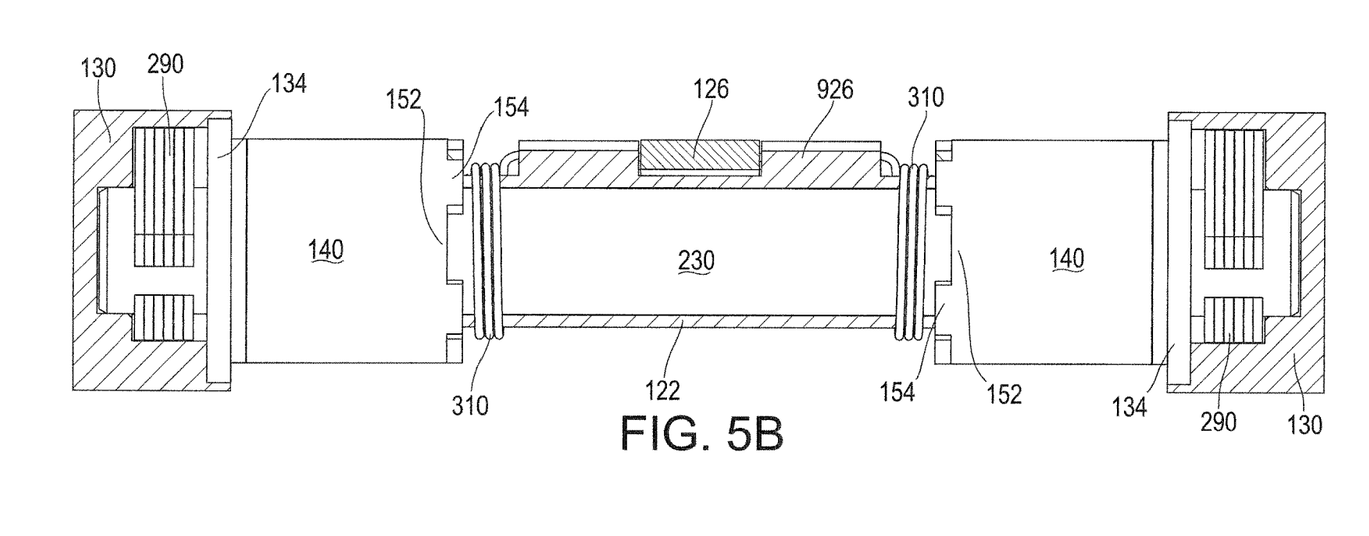

Referring to FIGS. 5a and 5b, the outer surface 232 of the shaft 230 and the inner surface 142 of the clutch housing 140 define a space therebetween. A cage 210 extends into the space defined between the outer surface 232 of the shaft 230 and the inner surface 142 of the clutch housing 140. Further, the cage 210 may be configured to simultaneously contact one or both of the shaft 230 and the clutch housing 140.

The cage 210 defines a gap that extends from an outer surface 214 of the cage 210 to an inner surface 216 of the cage 210. The cage 210 may encircle the gap. Upon positioning the cage 210 in the space defined between the inner surface 142 of the clutch housing 140 and the outer surface 232 of the shaft 230, the gap may be fully encompassed. In one embodiment, the gap is inaccessible upon positioning the cage 210 in the space between the clutch housing 140 and the shaft 230.

Referring back to FIGS. 3 and 4, the one or more rollers 260 are positioned to extend into the gap defined by the cage 210. The dimensions of the rollers 260 and/or the gap defined by the cage 210 are such that the one or more rollers 260 are moveable within the gap defined by the cage 210. The rollers may be free to rotate in a first position and inhibited from rotation in a second position within the gap.

Although FIGS. 3 and 4 illustrate five rollers 260a, 260b, 260c, 260d, 260e, each positionable within a different gap defined by cage 210, one of skill in the art would readily understand that more or less than five rollers 260 may be utilized without deviating from the teachings herein. In one embodiment, the rollers 260 are cylinders. In another embodiment, the rollers 260 are spheres. Preferably, the circumference of the one or more rollers 260 are substantially the same. It should be understood that various modifications to the rollers 260 would be readily understood by one of skill and do not deviate from the present invention.

FIGS. 7a-7g depict an embodiment of the cage 210 from various view-points. The cage 210 may include cage legs 218 positioned in the gap defined by the cage 210 to reduce the amount of backlash. As used herein, backlash is the sensation that a user feels such as when a roller clutch assembly does not immediately, evenly, and/or smoothly lock upon rotation in the locking direction. The cage legs 218 may be designed as spring elements or deformable elements that retain their original shape after a deformation. Additionally, the cage legs 218 may bias the rollers 260 toward one end of the gap defined by the cage 218. Preferably, the cage legs 218 bias the rollers toward the locked position whereby the rollers 260 are wedged and/or inhibited from rolling or movement.

In one embodiment, the cage legs 218 extend from the cage 210 and/or form an integral part of the cage 210. The feet portion 220 of the cage legs 218 are designed to contact a roller 260. Although FIGS. 7a-7g depict cage legs 218 having two prongs, various modifications to the cage legs 218 may be readily implemented by one of skill in the art without deviating from the present invention.

The cage 210 may also include a contacting edge 226. The contacting edge 226 is designed to reduce friction between the contacting edge 226 and the roller 260 to facilitate rolling or movement of the roller 260 while contacting the contacting edge 226. In one embodiment, the contacting edge 226 is positioned in the gap defined by the cage 210 across from the cage legs 218.

The cage 210 includes an engagement section 222 that may directly or indirectly engage the actuator sleeve 122. The engagement section 222 may also include an engagement component 224. The engagement component 224 extends both axially and radially from the engagement section 222 of the cage 210. In one embodiment, the engagement component 224 engages the clutch housing 140.

In another embodiment, the engagement component 224 engages both the clutch housing 140 and the actuator sleeve 122.

Figure 9A:
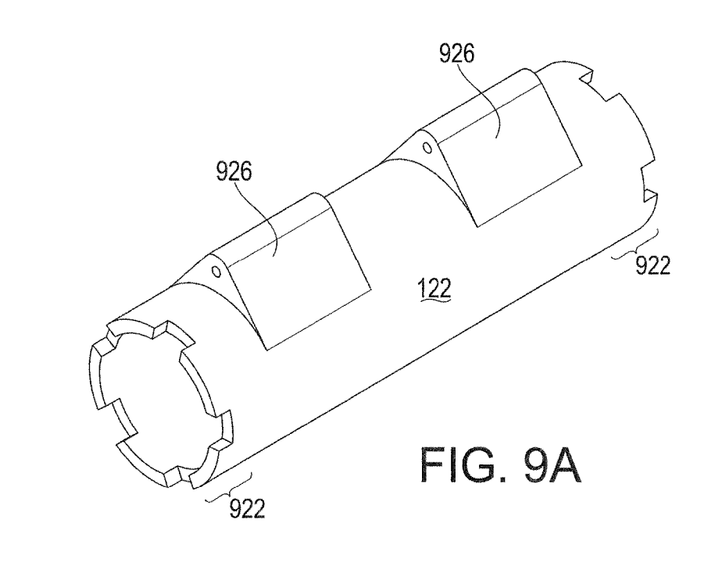
FIGS. 9a-9c depict an embodiment of an actuator sleeve component that can be used in the tray table assembly of FIG. 1.
Figure 9B:
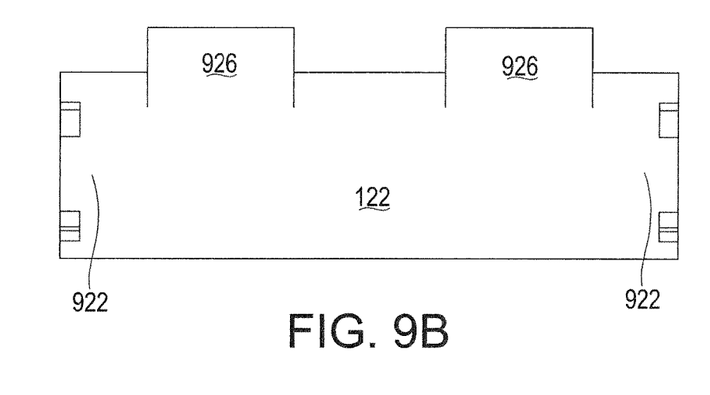
Figure 9C:
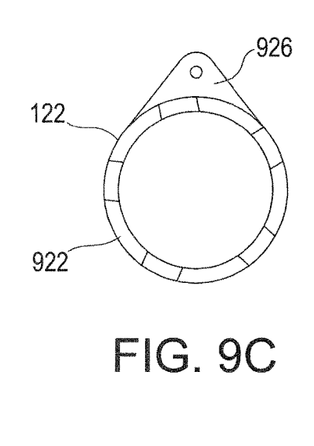

Referring to FIG. 9, the actuator sleeve 122 has a lever portion 926 that enables the actuator 120 to affect the actuator sleeve 122 upon actuation. In one embodiment, actuation imparts a force onto the lever portion 926 that results in rotation of the actuator sleeve 122. One or more end sections of the actuator sleeve 122 may have an engagement section 922 that engages an engagement section 222 of the one or more cages 210.

In one embodiment, the engagement section 922 of the actuator sleeve 122 has a complementary configuration to the engagement section 222 and/or engagement component 224 of the cage 210 in order to facilitate mating. In another embodiment, the engagement section 922 of the actuator sleeve 122 and the engagement section 222 of the cage 210 are affixed by way of well-known means, including welding, adhesives, riveting, or other fastening or affixing means. Yet, in a further embodiment, the actuator sleeve 122 and the cage 210 are combined to form one integral structure.

In one embodiment, the clutch housing 140 has an engagement section 152. The engagement section 152 of the clutch housing 140 includes one or more rotational protrusions 154 extending from the engagement section 152 of the clutch housing 140. The engagement component 224 of the cage 210 may be positioned between the rotational protrusions 154 of the engagement section 152 of the clutch housing 140.

Preferably, the distance between the rotational protrusions 154 of the clutch housing 140 is greater than the width of the engagement component 224, thereby enabling the cage 210 to rotate with respect to the clutch housing 140 until the engagement component 224 contacts one or more of the rotational protrusions 154 of the clutch housing 140. A bias element 310 may be employed to bias an engagement component 224 of the cage 210 in a first direction toward and/or against a rotational protrusion 154 of the clutch housing 140. Preferably, the bias element 310 biases the cage 210 toward a non-contacting position, wherein the contacting edge 226 of the cage 210 cannot contact roller 260.

The functionality of the aforementioned features will now be discussed in more detail below. Embodiments of the present invention enable a locking feature that prevents the clutch housing 140 from rotating with respect to the shaft 230. Referring to FIGS. 6a and 6b, the clutching house 140 has a free-movement direction and a locking direction. In the free-movement direction, the clutch housing 140 may continuously rotate around the shaft 230 with minimal hindrance from the rollers 260. In the locking direction, the clutching housing 140 is prevented or greatly hindered from rotating as a result of the rollers 260 being wedged between the inner surface 142 of the clutch housing 140 and the outer surface 232 of the shaft 230.

More specifically, in one embodiment, as the clutch housing 140 rotates in the free-movement direction (such as clockwise in FIGS. 6a and 6b) the one or more rollers 260 are moved into the pocket portion 148 of the indent 144 of the inner surface 142 of the clutch housing 140. As the clutch housing 140 continues to rotate in the free movement direction, the rollers 260 roll and/or slide freely as the pocket portion 148 of the indent 144 of the clutch housing 140 pushes the rollers 260 in the free movement direction.

However, in the same embodiment, as the clutch housing 140 is rotated in the locking direction (such as counter-clockwise in FIGS. 6a and 6b), the rollers 210 move into the slope portion 146 of the indent 144 of the inner surface 142 of the clutching house 140. Movement of the rollers 210 into the slope portion 146 may be facilitated by the cage legs 218, which bias the rollers 210 toward the sloping portion 146 of the indent 144.

As the depth of the indent 144 decreases in the slope portion 148, the space between the inner surface 142 of the clutch house 140 and the outer surface 232 of the shaft 230 becomes less than the diameter of the one or more rollers 210, thus wedging the rollers 210 between the inner surface 142 of the clutch house 140 and the outer surface 232 of the shaft 230. This wedging effect produces friction between the rollers 260, the clutch housing 140, and the shaft 230 to effectively prevent or greatly hinder rotation of the clutching house 140 in the locking direction.

The releasable roller clutch assembly 100 is able to freely rotate in the locking direction upon actuation by the user. By actuating the actuator 120, the cage 210 is positioned to prevent the roller 210 from entering the section of the slope portion 146 where the rollers 210 are wedged between the clutch housing 140 and the shaft 230. Accordingly, actuation enables the clutch housing 140 to rotate around the shaft 230 in the locking direction with minimal hindrance from the rollers 260.

In one embodiment, actuation of the actuator 120 applies a force to the level portion 926 of the actuator sleeve 122 to rotate the actuator sleeve 122 with respect to the clutch housing 140. The force applied to the actuator sleeve 122 may also rotate the cage 210 with respect to the clutch housing 140 because of engagement between the actuator sleeve 122 and the cage 210. Accordingly, rotation of the actuator sleeve 122 rotates the cage 210 from the non-contacting position to the contacting position. In an embodiment where a spring element 310 is employed to maintain the position of the cage 210 with respect to the clutch housing 140, the force applied to the level portion 926 of the actuator sleeve 122 must overcome the resistance provided by spring element 310 to rotate the actuator sleeve 122 with respect to the clutch housing 140.

As depicted in FIG. 6b, as the cage 210 rotates with respect to the clutch housing 140 into the contacting position, the contacting edge 226 advances to prevent the roller 260 from entering the section of the sloping portion 146 of the indent 144 where wedging is possible or to remove a wedged roller 260 from the section of the sloping portion 146 where wedging is possible. Furthermore, upon deactuation, the cage may rotate into the non-contacting position and the contacting edge 226 retracts, thereby enabling the roller 210 to move into the section of the sloping portion 146 of the indent 144 where wedging is possible.

While actuated, the releasable roller clutch assembly 100 may effectively function as a hinge by enabling the clutch housing 140 to rotate in both directions. Additionally, friction mechanisms 290 may be employed to resist rotation of the shaft 230 with respect to the mount 130. In one embodiment, the friction mechanisms 290 employ one or more asymmetrical torque elements 292 to provide impetus to the shaft 230 to rotate in one direction. For example, in an embodiment of a tray table system employing a releasable roller clutch assembly 100, the friction mechanism 290 may be configured to counteract the weight of the tray to prevent the user from feeling the full weight of the tray 110 upon actuation of the releasable roller clutch assembly 100.

Assemblies and/or systems employing embodiments of the present invention include roller clutch assemblies, adjustable hinge assemblies, and tray table assemblies with a releasable roller clutch and an adjustable hinge. Such tray table assemblies may further include infinite angular adjustability as well as overload protection features in case a force is applied to the releasable roller clutch assembly 100 that exceeds the weight limit. For example, the torque element may inhibit rotation of the shaft with respect to the mounting element when the cage of the roller clutch is in the locking position and when the rollers are in the locked position, thus providing overload protection allowing rotation of the shaft when a load on the clutch housing exceeds a predetermined torque. In other words, the torque element may provide friction and therefore resists rotation of the shaft with respect to the mounting element. In contrast, the clutch can prohibit relative rotation. This utilization of the torque element can help reduce the risk of damage to an assembly, such as a tray assembly, if the load exerted on the assembly exceeds a certain amount when the clutch is in the locked condition.

Additionally, tray table assemblies employing embodiments of the releasable roller clutch assembly 100 may also be equipped with a latching mechanism (not shown) to be used in the same seating tray table arrangement to allow the tray table to be stowed up along the back of the seat. In this embodiment, ergonomically advantageous actuators 120 combined with a latch actuation button (not shown) may drive both a latch (not shown) and hinge mechanism with single point of touch.

Figure 10:
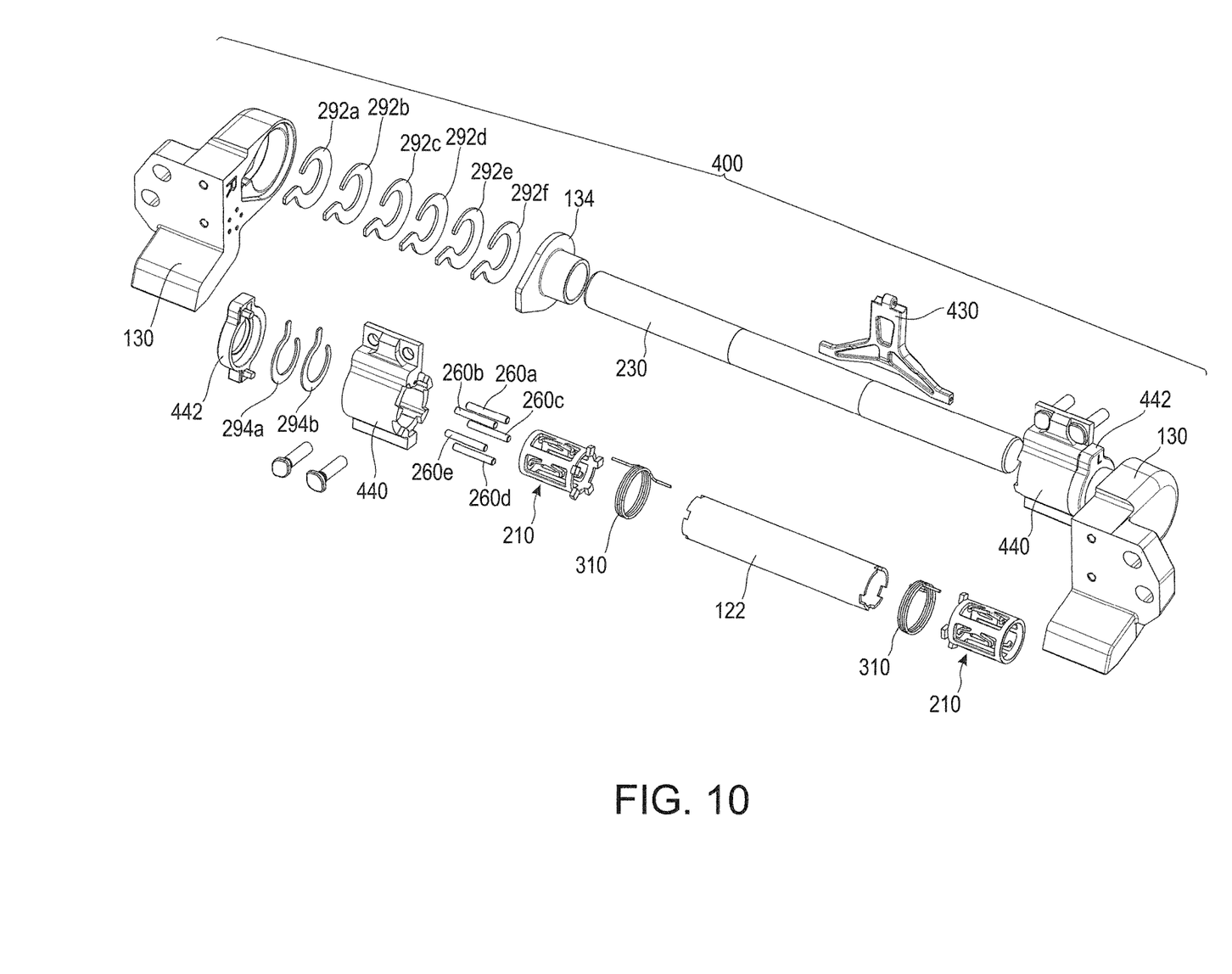
FIG. 10 is an exploded view of another embodiment of a releasable roller clutch assembly, but without an actuator according to aspects of the invention.

FIG. 10 is an exploded view of another embodiment of a roller clutch assembly 400, but without an actuator 410. The roller clutch assembly 400 is similar to the roller clutch assembly 100 (depicted in FIGS. 1-9), except for features discussed below. Accordingly, where the roller clutch assembly 400 utilizes features similar to those of the roller clutch assembly 100, the same reference numbers are applied.

The roller clutch assembly 400 includes a clutch housing 440 that is positionable around a shaft 230. The clutch housing 440 has an inner surface 142 that defines one or more indents 144. The clutch housing 440 also has a damping cap 442. The damping cap 442 may be configured to receive one or more torque elements 294, e.g., by defining a recess adapted for receiving the torque elements 294a and 294b. In one embodiment, the torque elements 294 are securely disposed within the damping cap 442 of the clutch housing 140 and positioned around the shaft 230.

The torque elements 294 provide symmetrical or asymmetrical frictional torque, e.g., to resist movement of the shaft 230. In one embodiment, torque elements 294 are similar, or the same, as torque elements 292. Although torque elements 294 are depicted in FIG. 10 as being positioned to provide asymmetrical friction torque in a rotational direction that is opposite the asymmetrical friction torque provided by torque elements 292, in one embodiment torque elements 292 and 294 provide asymmetrical friction torque in the same rotational direction. However, by positioning torque elements 294 to impart asymmetrical frictional torque on the shaft 230 in a rotational direction that is opposed the asymmetrical friction torque provided by torque elements 292 in FIG. 10, walking during vibration (also called "vibration walking") may be reduced or prevented. Vibration walking may occur when the rollers are in a locked position and vibrations and/or movements impart a rotational force on the clutch housing about the shaft. Because the rollers are in a locked position, the clutch housing is permitted to rotate in only one direction about the shaft. Accordingly, as the vibrations and/or movements impart forces on the clutch housing in both rotational directions about the shaft, the clutch housing rotates in one direction as movement in the opposed direction is prevented by the rollers being in the locked position.

The torque elements 294 reduce and/or prevent vibration walking by imparting asymmetrical friction torque in the direction opposite of the permitted direction of rotation for the clutch housing 440 when the rollers 260 are in the locked position. Although the torque elements 294 are illustrated as positionable within the clutch housing 440, the torque elements 294 may be coupled to the shaft 230 along various portions of the shaft 230. For example, the torque elements 294 may be coupled to the shaft 230 and disposed in the mount housing 130.

Figure 11A:
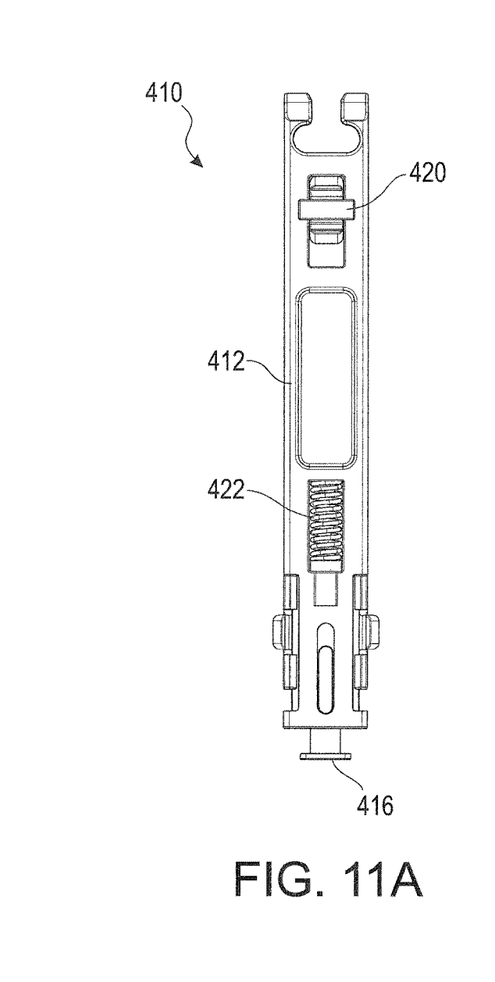
FIG. 11A is a perspective view of another embodiment of an actuator in accordance with aspects of the invention.
Figure 11B:
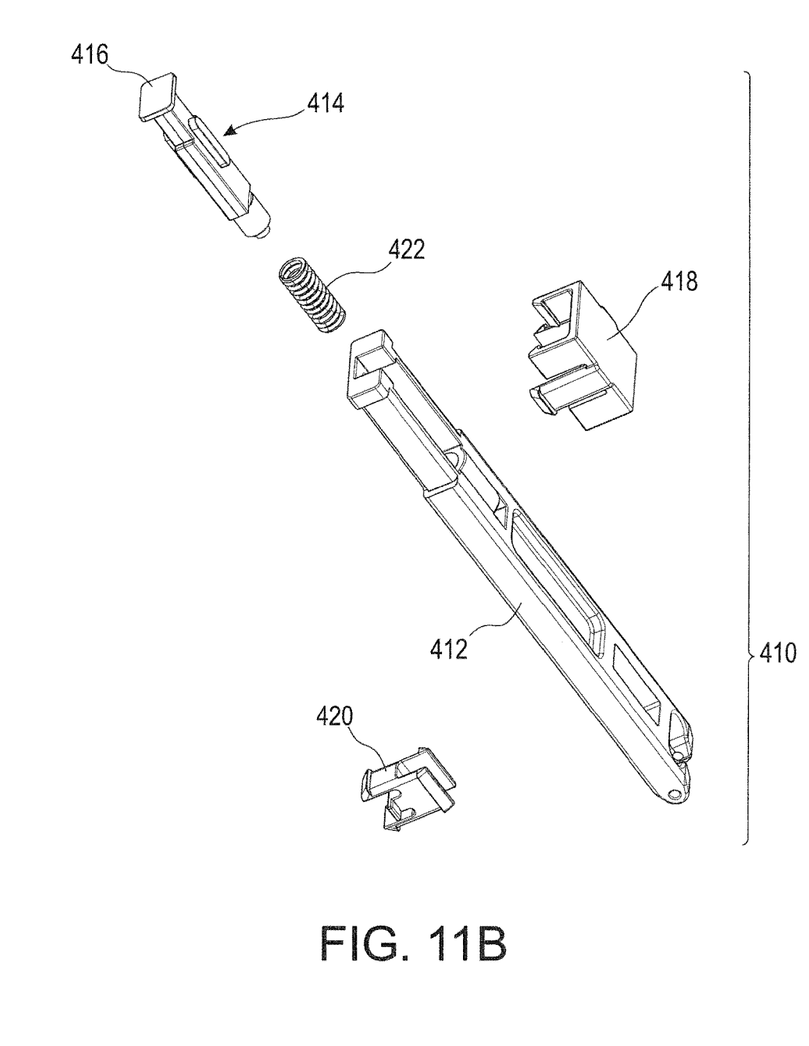
FIG. 11B is an exploded view of the actuator in FIG. 11A.

Referring to FIGS. 11A and 11B, the roller clutch assembly 400 also includes an actuator 410 that may be actuated by pushing or pulling a portion of the tray table 110. For example, the actuator 410 may be actuated by sliding a portion of the tray table 110 towards or away from the actuator sleeve 122. Similar to the actuator 120 of the embodiment of the roller clutch assembly 100, the actuator 410 is coupled to the actuator sleeve 122 such that actuation of the actuator 410 provides impetus to rotate the actuator sleeve 122.

The actuator 410 includes a rod 412, a stopper 414 having a button portion 416, a clip latch 418, a clip hinge 420, and a spring 422. The actuator 410 is coupled to the fork link 430 to enable actuation of the actuator sleeve 122. In one embodiment, the actuator 410 is coupled to the fork link 430 by way of a pin rotatably connecting the rod 412 and the fork link 430.

The actuator 410 is actuated by pressing the button portion 416 of the stopper 414, which imparts a load on the spring 422 that may, ultimately, impart a force on the actuator sleeve 122. For example, the spring 422 may require a predetermined load before actuating the actuator sleeve 122. Although the actuator 410 is actuated by way of a button portion 416 in FIGS. 11A and 11B, the actuator 410 may be configured to actuate upon a force being exerted on the push rod 422 in a direction toward or away from the shaft 230 and/or the actuator sleeve 122. For example, by sliding a portion of the tray table 110 toward the shaft 230, the rod 422 may urge the fork link 430 to impart a force onto the lever portion 926 of the actuator sleeve 122 that results in rotation of actuator sleeve 122.

While preferred embodiments of the invention have been shown and described herein, it will be understood that such embodiments are provided by way of example only. Numerous variations, changes and substitutions will occur to those skilled in the art without departing from the spirit of the invention. Accordingly, it is intended that the appended claims cover all such variations as fall within the spirit and scope of the invention.

What is claimed:

1. An adjustable hinge assembly providing overload protection, the adjustable hinge assembly comprising:
    a mounting element configured to be mounted to a first component and comprising a bore defining a hinge axis;
    a shaft coaxially received within the bore of the mounting element and longitudinally-extending therefrom;
    a clutch housing configured to be mounted to a second component and comprising a bore also defining the hinge axis coaxial with the bore of the mounting element with the shaft longitudinally-extending therethrough and comprising circumferentially-spaced sloped indents therein, the shaft and the clutch housing together defining a space radially therebetween;

an annular cage disposed within the space defined between the shaft and the clutch housing, the cage being rotatable relative to the clutch housing between an unlocking position and a locking position, and having circumferentially-spaced apertures therethrough aligned with the sloped indents of the clutch housing;

rollers positioned within the apertures in the cage and received within the sloped indents of the clutch housing, the rollers permitting rotation of the shaft relative to the clutch housing in both directions when the cage is rotated to the unlocking position and the rollers are not wedged between the shaft and the sloped indents in an unlocked position, and the rollers preventing rotation of the shaft relative to the clutch housing when the cage is rotated to the locking position and the rollers are wedged between the shaft and the sloped indents in a locked position;

an actuator sleeve rotatably disposed on the shaft on a side of the clutch housing opposite the mounting element and coupled to the cage to rotate the cage therewith between the locking position and the unlocking position; and a first torque element comprising a torque washer or clip coupled to the shaft and the bore of the mounting element, the first torque element providing friction torque to inhibit rotation of the shaft when the cage is in the locking position and the rollers are in the locked position, and the first torque element providing overload protection allowing rotation of the shaft when a load on the clutch housing exceeds a predetermined torque.

2. The adjustable hinge assembly of claim 1, further comprising a second torque element comprising a torque washer or a clip coupled to the shaft and the bore of the mounting element, the second torque element providing friction torque to inhibit rotation of the shaft within the bore of the clutch housing.

3. The adjustable hinge assembly of claim 2, wherein the second torque element provides asymmetrical friction torque in a direction opposed to asymmetrical friction torque provided by the first torque element.

4. An adjustable hinge assembly comprising:
a mounting element configured to be mounted to a first component and comprising a bore defining a hinge axis;
a shaft coaxially received within the bore of the mounting element and longitudinally-extending therefrom;
a clutch housing configured to be mounted to a second component and comprising a bore defining a hinge axis coaxial with the bore of the mounting element with the shaft longitudinally-extending therethrough and comprising circumferentially-spaced sloped indents therein, the shaft and the clutch housing together defining a space radially therebetween;
an annular cage disposed within the space defined between the shaft and the clutch housing, the cage being rotatable relative to the clutch housing between an unlocking position and a locking position, and having circumferentially-spaced apertures therethrough aligned with the sloped indents of the clutch housing;

rollers positioned within the apertures in the cage and received within the sloped indents of the clutch housing, the rollers permitting rotation of the shaft relative to the clutch housing in both directions when the cage is rotated to the unlocking position and the rollers are not wedged between the shaft and the sloped indents in an unlocked position, and the rollers preventing rotation of the shaft relative to the clutch housing when the cage is rotated to the locking position and the rollers are wedged between the shaft and the sloped indents in a locked position;

an actuator sleeve rotatably disposed on the shaft on a side of the clutch housing opposite the mounting element and coupled to the cage to rotate the cage therewith between the locking position and the unlocking position;

a first torque element comprising a torque washer or clip coupled to the shaft and the bore of the mounting element, the first torque element providing friction torque to inhibit rotation of the shaft relative to the mounting element when the cage is in the locking position and when the rollers are in the locked position, and the first torque element providing overload protection allowing rotation of the shaft when a load on the clutch housing exceeds a predetermined torque; and an actuator coupled to move the actuator sleeve and the cage from the locking position to the unlocking position.

5. The adjustable hinge assembly of claim 4, further comprising a biasing mechanism positioned to bias the cage toward the locking position, the actuator being configured to move the cage toward the unlocking position against the biasing mechanism.

6. The hinge assembly of claim 4, further comprising a second torque element comprising a torque washer or clip coupled to the shaft and the bore of the mounting element, the second torque element providing friction torque to inhibit rotation of the shaft within the bore of the clutch housing.

7. The hinge assembly of claim 6, wherein the second torque element is positioned within the clutch housing.

8. The hinge assembly of claim 7, wherein the second torque element provides asymmetrical friction torque in a direction opposed to asymmetrical friction torque provided by the first torque element.

9. The hinge assembly of claim 4, wherein the actuator includes a push rod coupled to the actuator sleeve and wherein the actuator is configured to rotate the actuator sleeve upon a force being exerted on the push rod in a direction toward or away from the shaft.

* * * * *